July 8, 1969     R. D. KIRKENDALL ET AL     3,453,882
DEVICE FOR INDICATING PASSAGE OF A PROJECTILE IN A BORE
Filed Nov. 21, 1967     Sheet 1 of 2
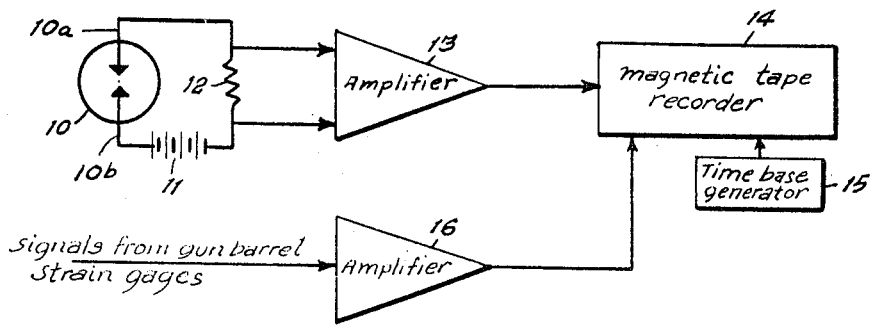
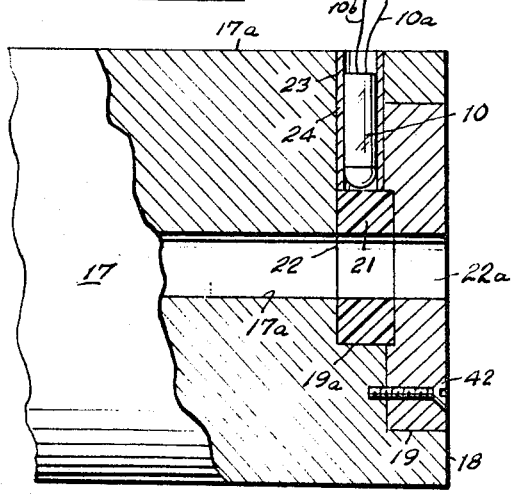
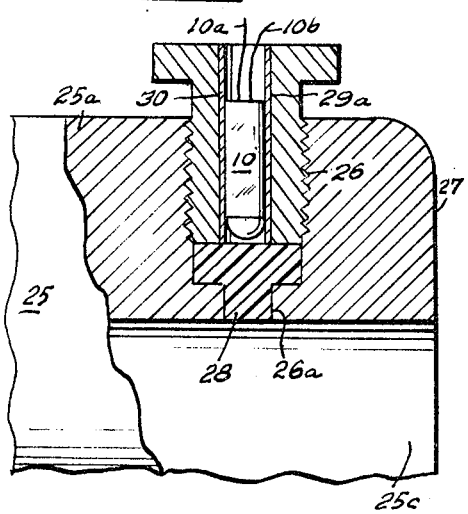
INVENTORS,
Richard D. Kirkendall
Robert W. Deas
Nelson H. McCall
Herman P. Gay
By: Harry M. Saragovitz, Edward J. Kelly &
R. P. Gibson     ATTORNEYS.

INVENTORS
Richard D. Kirkendall
Robert W. Deas
Nelson H. McCall
Herman P. Gay

By: Harry M. Saragovitz,
Edward J. Kelly &
R. P. Gibson

ATTORNEYS

United States Patent Office 3,453,882
Patented July 8, 1969

3,453,882
DEVICE FOR INDICATING PASSAGE OF A PROJECTILE IN A BORE
Richard D. Kirkendall, Havre de Grace, Robert W. Deas, Abingdon, Nelson H. McCall, Charlestown, and Herman P. Gay, Aberdeen, Md., assignors to the United States of America as represented by the Secretary of the Army
Filed Nov. 21, 1967, Ser. No. 684,834
Int. Cl. G01l 5/14
U.S. Cl. 73—167                 6 Claims

ABSTRACT OF THE DISCLOSURE

The time at which a projectile emerges from the muzzle of a gun is measured by recording the signal from an electrical circuit containing a photo-duo-diode located in a radial hole near the muzzle of the gun. The signal is recorded as a reference on magnetic tape along with a time base, gun chamber pressure records and other data in studies of interior ballistics. The signal is also used to trigger an X-ray system when taking radiographs of projectiles in flight.

---

The invention described herein may be manufactured, used, and licensed by or for the Government for governmental purposes without the payment to us of any royalty thereon.

In the studies of the interior ballistics of guns, the instant of shot ejection is an important reference. In the past this was measured by arranging several copper wires at the muzzle so that they formed an electrical contact with the rotating band but not with the projectile body. These wires are bent or destroyed by each shot so that they must be replaced. Also contact is not always made with the rotating band because gases sometimes leak past the projectile and bend the wires. Further, if the copper wire contacts are not set carefully they may contact the body of the projectile giving a false signal. In addition, metallic contacts cannot be used when the rotating band of the projectile is non-metallic. From time to time there have been attempts to measure the velocity of a projectile by the use of probes or contacts positioned in the gun bore. The problem encountered here is that the probes or contacts must be replaced. This is not overly objectionable in an experimental weapon. However, in a fire control system for a tank weapon such probes or contacts would not be acceptable. Physical contact of the rotating band of the projectile with the probes in the gun barrel and insulated therefrom complete electrical circuits through the gun or between the probes. Further, it has been found that systems for obtaining ballistic data fail to trigger fiducial circuits and that correlations with pressure-time and travel-time were not always consistent due to the incorporation of such probes in the systems.

Other observations have shown that the contact of the projectile with the aforementioned probes could produce yaw which degraded the accuracy and were suspected of causing some aluminum projectiles to break up. Also, it is necessary that the probes and insulators be changed after each round.

An object of the invention is a device for indicating passage of a projectile in the bore of a gun to determine the time emergence of the projectile without interfering with the projectile travel and requiring no maintenance between firing of rounds.

Another object of the invention is means to generate a trigger-pulse for triggering an X-ray system for radio photographing the projectile at the time of projectile ejection from the gun.

The invention will be more fully understood and its objects and advantages further appreciated by referring now to the following detailed specification taken in conjunction with the accompanying drawings in which:

FIGURE 1 is a general block diagram of the invention;

FIGURE 2 is a fragmentary longitudinal view showing the infrared detector means affixed in the barrel of one type of gun adjacent its muzzle.

FIGURE 3 is a view similar to FIGURE 2 showing the infrared detector means mounted in the barrel of a large caliber gun adjacent its muzzle.

Figure 4:
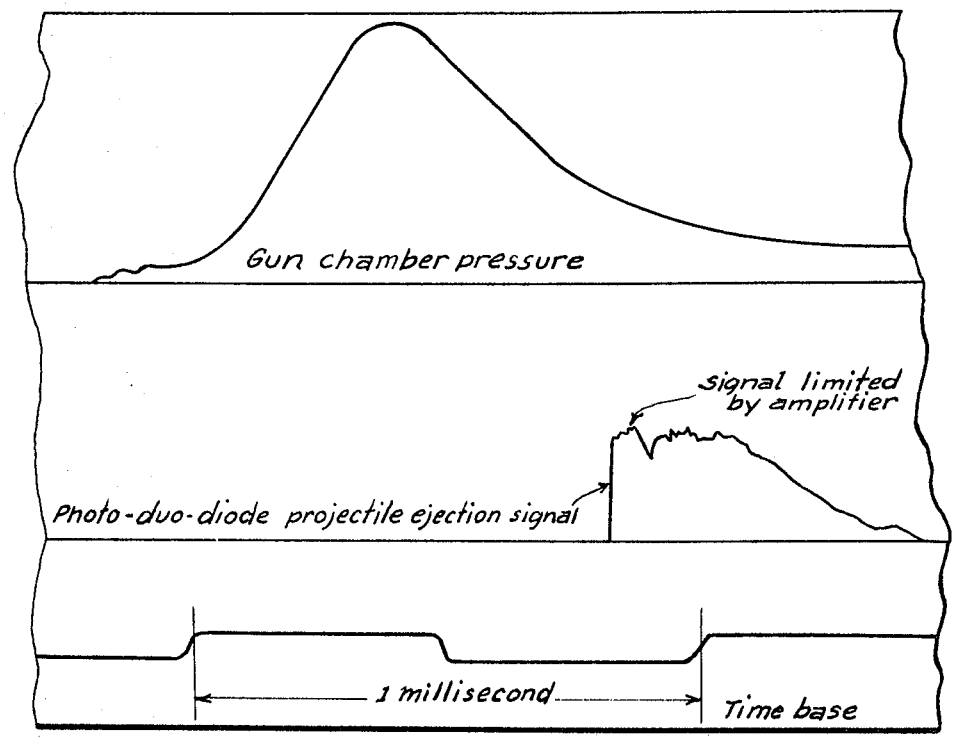
FIGURE 4 illustrates graphs obtained through use of the invention.

Referring to FIGURE 1, 10 is a photo-duo-diode having a peak response in the infrared region connected in series with a potential source 11 and a resistor 12 across which the time of shot ejection signal is developed. The diode 10 is mounted in the barrel of a gun adjacent its muzzle as subsequently disclosed and becomes conductive to produce a signal across resistor 12 when exposed to radiation from the hot gases behind the projectile when the base of the projectile passes the diode at the gun muzzle. The resistor 12 is coupled to an electronic amplifier 13 which in turn is coupled to a magnetic tape recorder 14 whereby the signal developed across resistor 12 is amplified and recorded on the tape of recorder 14 which at the same time is also recording the signals from electronic time base generator 15 coupled thereto to provide a time base whereby the time of projectile or shot ejection is obtained. Also coupled to recorder 14 through electronic amplifier 16 are signals indicative of gun chamber pressures which are generated by strain gages, not shown, coupled to the peripheral surface of the gun barrel and spaced thereon along the longitudinal axis thereof.

When it is desired to obtain a graphical record of the firing, such as is illustrated in FIGURE 4 which is a copy of an actual record of a 0.223 caliber firing, the magnetic tape is played back into a device such as a "Recordex" which produces the data stored in the magnetic tape in graphic form on a paper as shown in FIGURE 4. From analyses of the graphs, the time of shot ejection and gun chamber pressures are determined.

In FIGURE 2 the photo-duo-diode 10 is shown mounted in the wall 17a of a heavy wall gun barrel 17 adjacent the muzzle 18. A recess 19 formed in the barrel 17 and extending inwardly of muzzle 18 has a reduced section 19a which supports a ring 21 of clear heat resistant plastic commercially known as Lexan. A metal retaining disc 20 affixed in recess 19 by means of machine screws 42 additionally supports ring 21. Ring 21 and disc 20 are apertured to accommodate the diameter of bore 17a as indicated by reference numerals 22 and 22a, respectively. In barrel 17 there is formed a radial bore 23 in diametric alignment with ring 21 and extending thereto. The photo-duo-diode 10 is placed in a fiber sleeve 24 which is inserted in radial bore 23. The plastic ring 21 protects the diode 10 from the hot propellant gases while permitting the infrared radiation of such gases to pass through to photo-duo-diode 10. Ring 21 normally does not require cleaning between rounds.

FIGURE 3 shows the photo-duo-diode 10 mounted in the wall 25a of a large caliber gun barrel 25. A radial bore 26 formed in the wall of gun barrel 25, adjacent muzzle 27, having a section of reduced diameter 26a, adjacent the gun bore 25c, houses in the section of reduced diameter the body of a T-shaped cylindrical plug 28 of clear, heat resistant plastic known in the trade as Lexan which extends therethrough to the surface of the gun barrel 25c. A retaining screw 29 in threaded engagement with the threaded section of radial bore 26 retains plug 28 in the radial bore and is provided with a longitudinal bore 29a extending therethrough with a fiber liner 30 inserted therein housing the photo-duo-diode 10.

Figure 5:
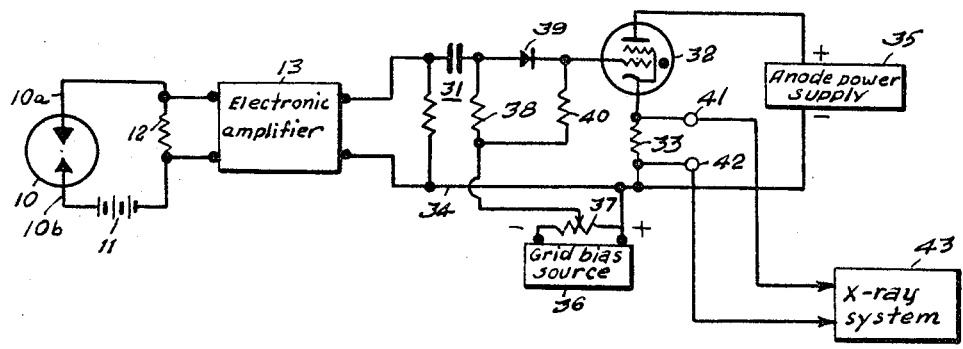
FIGURE 5 is a schematic diagram of an embodiment of the invention utilized to trigger X-ray systems.

FIGURE 5 is a diagrammatic illustration of another embodiment of the invention wherein a trigger pulse is generated in response to the signal generated by the action of photo-duo-diode 10 when exposed to the radiation of propellant gases at the time the projectile passes through the muzzle end of the gun whereby trigger pulse requirements of an X-ray system for taking radiographs of the projectile in flight are obtained. Photo-duo-diode 10 is mounted in a radial bore in the gun and connected in series with potential source 11 and resistor 12 which is coupled to electronic amplifier 13 whereby the signal developed across resistor 12 at the time of shot ejection is amplified as before described. The amplified signal is coupled by means of an R-C coupling network 31 to the input of thyratron tube 32. A cathode resistor 33 couples the cathode of thyratron tube 32 to the common circuit 34, the trigger pulse for the X-ray system 43 being developed thereacross. Reference numeral 35 indicates the anode power supply and 36 the grid bias source for thyratron tube 35. The grid bias is made adjustable by connecting a potentiometer 37 across the terminals of grid bias source 36. The positive terminal of grid bias source 36 is connected to common circuit 34 and the arm of potentiometer 37 to the grid of tube 32 through resistor 38 of R-C network 31 and diode 39 which is connected between the R-C network and said grid and poled to prevent kickback due to thyratron tube 32 action. A bleeder resistor 40 is provided between said grid and the potentiometer arm for the purpose of draining any accumulated charge on said grid.

In operation, the signal generated across resistor 12 due to the response of photo-duo-diode 10 to the infrared radiation of the propellant gases at the time of projectile ejection is amplified by electronic amplifier 13. The amplified signal is coupled by R-C network 31 to the input of thyratron tube 32 causing the grid thereof to reach firing potential whereupon thyratron tube 32 conducts with the resultant voltage drop across cathode resistor 33 providing a trigger pulse at terminals 41–42 of cathode resistor 33 which are connected by well known means to X-ray system 43 whereby the trigger pulse so produced triggers the X-ray system to radiograph the projectile in flight. The mechanics of positioning the equipment of the X-ray system transversely of the projectile trajectory is well known and forms no part of the invention.

Although specific embodiments of the invention have been illustrated and described, it will be understood that this is but illustrative and that various modifications may be made therein without departing from the spirit of the invention.

We claim:

1. A device for indicating the passage of a projectile at the time of ejection from a gun barrel comprising in combination, a gun, infrared radiation detection means adapted to close an electrical circuit, means positioning said infrared radiation detection means in the wall of said gun adjacent the muzzle and in communication with the bore, electrical circuit means including said infrared radiation detection means for generating an electrical signal in response to the detection of the infrared radiations of the propellant gases by said infrared radiation detection means when a projectile is fired, electronic amplifier means coupled to said electrical circuit means for amplifying said signal, and recording means coupled to said electronic amplifier for recording said electrical signal.

2. The invention in accordance with claim 1 wherein said electrical circuit means including said infrared detection means comprises a resistor across which said signal is generated in series with a potential source and a photo-duo-diode.

3. The invention in accordance with claim 2 wherein said means positioning said infrared detection means in the wall of said gun comprises a radial bore extending through said wall provided with a fiber liner in which is releasably held said photo-duo-diode, and means for protecting said photo-duo-diode from said gases comprising a heat resistant plastic ring capable of transmitting said infrared radiations to the photo-duo-diode affixed in a recess in the muzzle of said gun in alignment with said radial bore.

4. The invention in accordance with claim 2 wherein said means positioning said infrared detection means in the wall of said gun comprises a threaded radial bore extending through said wall, a heat resistant, infrared transmitting plastic plug affixed in said radial bore adjacent the bore of said gun for protecting said photo-duo-diode from said gases, and a screw in threaded engagement with said threaded radial bore formed with a longitudinal bore provided with a fiber liner in which is releasably held said photo-duo-diode.

5. Apparatus for measuring the time of ejection of a projectile fired from the barrel of a gun comprising in combination, a photo-duo-diode releasably fixed in a radial bore in said gun adjacent the muzzle and in communication with the bore thereof, a potential source in series connection with a resistor and said photo-duo-diode, said photo-duo-diode responsive to the infrared radiation of the propellant gases as a projectile leaves the muzzle of said gun to cause a flow of current through said resistor producing an ejection signal thereacross, a first electronic amplifier for amplifying said shot ejection signal having the input thereof connected across said resistor and the output thereof coupled to a magetic tape recorder for recording the amplified ejection signal on the tape thereof, an electronic time base generator coupled to said magnetic tape recorder for producing a time base record on said tape, strain gages spaced along said barrel for producing signals indicative of the propellant gas pressures in the bore of said gun coupled to the input of a second electronic amplifier, the output of said second electronic amplifier coupled to said magnetic tape recorder for recording the amplified signals of said strain gages on said tape, said amplified signals of said strain gages and said ejection signal and said time base record being simultaneously recorded on said tape.

6. Apparatus for triggering an X-ray system for radio photographing a projectile emerging from a gun comprising in combination, a photo-duo-diode releasably fixed in a radial bore formed in said gun adjacent the muzzle and in communication with the bore thereof, a potential source in series connection with a resistor and said photo-duo-diode, said photo-duo-diode responsive to infrared radiation of the propellant gases as the projectile emerges from said gun to cause a flow of current through said resistor producing a signal thereacross, an electronic amplifier for amplifying said signal having the input thereof connected across said resistor, a thyratron having at least an anode, grid and cathode elements, a common circuit, an anode power supply connected between said anode and said common circuit, grid bias means connected between said grid and said common circuit, an R-C network, the input of said R-C network coupled to the output of said electronic amplifier and the output of said R-C network connected between said grid and said common circuit whereby the signal amplified by said electronic amplifier is applied to said grid causing the thyratron to fire producing a trigger signal across said cathode resistor, and means coupling said trigger signal to said X-ray system.

References Cited

UNITED STATES PATENTS

| | | | |
|---|---|---|---|
| 2,829,185 | 4/1958 | Macatician et al. | 73—167 XR |
| 2,939,318 | 6/1960 | Armi et al. | 73—167 |
| 3,019,073 | 1/1962 | Hall | 73—167 XR |
| 3,318,151 | 5/1967 | Behrendt et al. | 73—346 |
| 3,344,272 | 9/1967 | Unsworth | 73—355 XR |

LOUIS R. PRINCE, *Primary Examiner.*

JEFFREY NOLTON, *Assistant Examiner.*

U.S. Cl. X.R.

73—355; 250—83.3